United States Patent [19]

Meyerhoefer et al.

[11] 4,385,539
[45] May 31, 1983

[54] ARTICULATED DUST COVER MEANS FOR TABLE SAW OR OTHER POWER-DRIVEN APPARATUS

[75] Inventors: Carl E. Meyerhoefer, Little Neck; Carl H. Meyerhoefer, Dix Hills, both of N.Y.

[73] Assignee: Black & Decker Inc., Newark, Del.

[21] Appl. No.: 292,434

[22] Filed: Aug. 14, 1981

[51] Int. Cl.³ .............................................. B27B 5/24
[52] U.S. Cl. ...................................... 83/473; 83/477.1
[58] Field of Search ..................... 83/473, 477.1, 477.2, 83/522, 100; 51/269, 273, 166 FB, 166 R; 144/252 R

[56] References Cited

U.S. PATENT DOCUMENTS

| | | | |
|---|---|---|---|
| 2,850,054 | 9/1958 | Eschenburg | 83/473 |
| 2,852,047 | 9/1958 | Odlum et al. | 83/473 |
| 3,538,964 | 11/1970 | Warrick | 83/473 |
| 4,249,442 | 2/1981 | Fittery | 83/473 |
| 4,270,427 | 6/1981 | Colberg et al. | 83/473 |
| 4,270,428 | 6/1981 | Colberg | 83/477.2 |
| 4,276,799 | 7/1981 | Muehling | 83/473 |

*Primary Examiner*—Donald R. Schran
*Attorney, Agent, or Firm*—Edward D. Murphy; Walter Ottesen; Harold Weinstein

[57] ABSTRACT

The front panel of a table saw has a lever which controls the elevation of the saw blade relative to the saw table. The elevation control lever is also coupled to a bevel control means for tilting the saw blade (and its driving motor) with respect to the table. The combination of these translational and bevel movements results in a relatively large traverse of the elevation control lever. The elevation control lever projects through an opening in the front panel of the housing for the table saw, and this opening is of sufficient size and shape to accommodate the total excursion of the elevation control lever in its traverse. An articulated cover means is provided within the housing to prevent dust from entering into the housing via the opening, as well as to prevent inadvertent contact with the operating mechanism. This articulated cover means includes a first cover member which is disposed substantially flush against the opening on the inside of the front panel. This first cover member, which pivots in response to pivotal movement of the bevel control means (and the elevation control lever coupled thereto) has a size and shape sufficient to substantially cover the opening in the front panel in all positions of the bevel control means. The elevation control lever extends through an opening in the first cover member, and the opening is elongated to accommodate the translational movement of the elevation control lever. A second cover member is carried by the elevation control lever and substantially covers the elongated opening in the first cover member. The combination of the first and second cover members thus provides for a total coverage of the opening in the front panel of the saw housing, for all translational movements of the elevation control lever, and at any given setting of the bevel control means.

11 Claims, 10 Drawing Figures

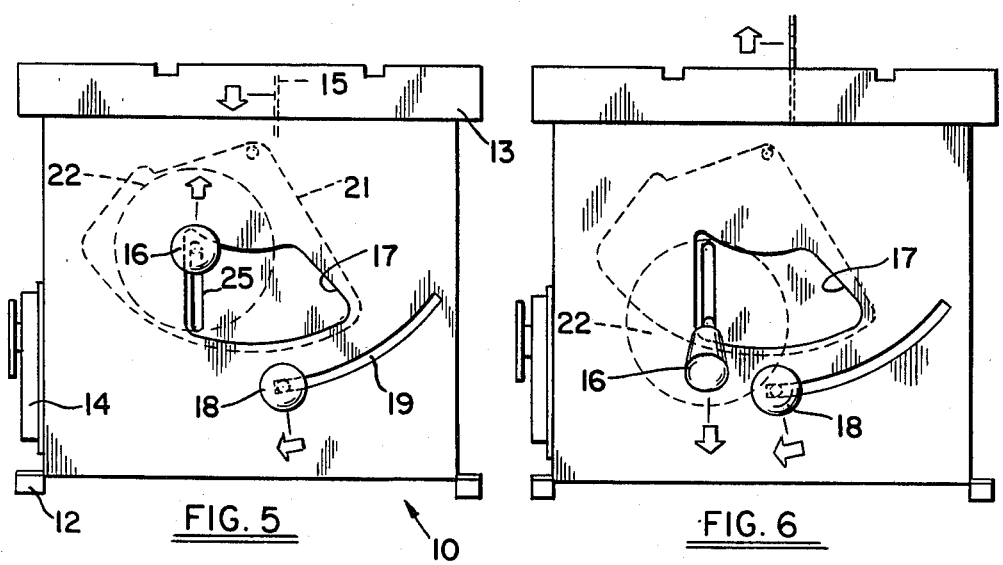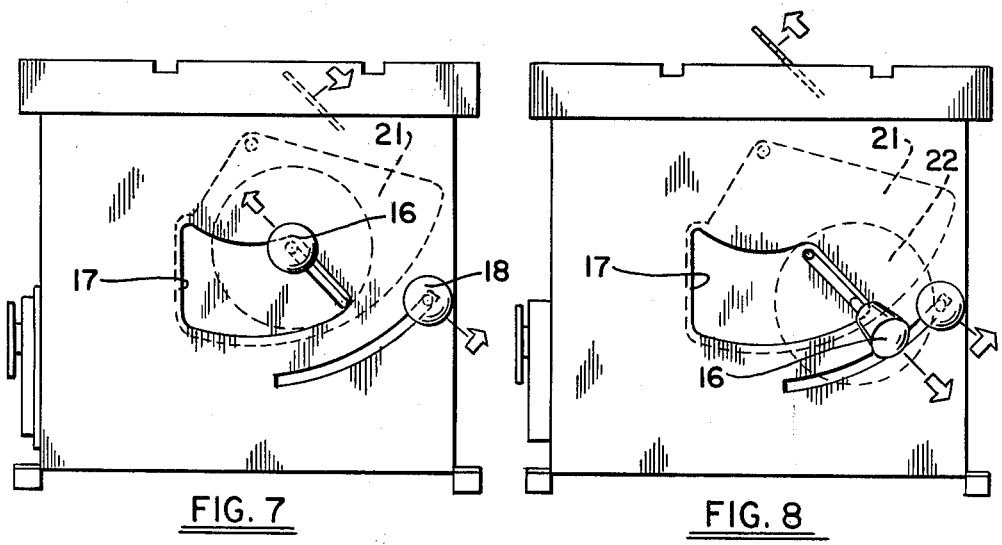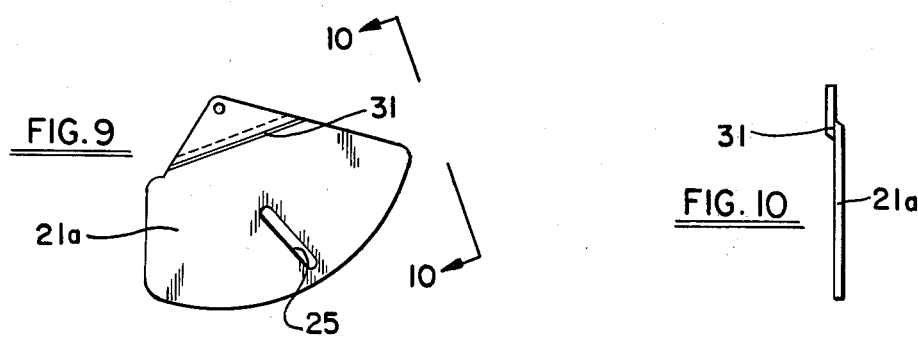

ARTICULATED DUST COVER MEANS FOR TABLE SAW OR OTHER POWER-DRIVEN APPARATUS

BACKGROUND OF THE INVENTION

While not necessarily limited thereto, the teachings of the present invention may find particular utility in a table saw described and claimed in the following U.S. patents:

U.S. Pat. No. 4,249,442 issued on Feb. 10, 1981
U.S. Pat. No. 4,270,427 issued on June 2, 1981
U.S. Pat. No. 4,270,428 issued on June 2, 1981
U.S. Pat. No. 4,276,799 issued on July 7, 1981

In these patents, a unique table saw is disclosed wherein the blade may be raised up out of the housing to engage a workpiece held securely on the table top. The raising or lowering of the blade is controlled by an elevation control lever that projects through an opening in the front panel of the housing for the table saw. This elevation control lever may also be locked in a desired elevated position to thereby firmly hold the saw blade with respect to the table at a desired depth-of-cut position, in which case the workpiece is moved into the blade (as in the case of a conventional arbor saw).

The elevation control lever is suitably coupled to a bevel control means which tilts the saw blade and its driving motor relative to the table for a bevel cut. In any position of the bevel control means, the elevation control lever has a limited translational movement to facilitate the raising of the saw blade out of the table. Thus, the elevation control lever has a relatively large traverse, and the opening in the front panel of the saw housing must be of sufficient size and shape to accommodate this traverse. Since this opening is relatively large, a suitable cover must be provided to prevent dust or other debris from entering into the housing, as well as to provide a protective shield to prevent inadvertent access to the mechanism within the housing.

In the prior art, of which I am aware, the opening has been covered by a double bellows comprising a vertically-arranged bellows within the housing and against the opening. The vertical bellows has an access opening therein through which the elevation control lever projects, and this access opening is in turn covered by a horizontally arranged bellows within the housing adjacent to the first bellows.

These cooperating bellows, while satisfactory for the purposes intended, are relatively expensive and are primarily intended for a large heavy-duty industrially-rated machine. However, in adapting the described table saw to the design of a smaller and more compact machine, one intended for moderate usage by contractors and homeowners, the cooperating double-bellows arrangement is relatively expensive and unsuitable. Additionally, the housing for the moderate-duty saw is smaller than the corresponding industrial machine, leaving insufficient room for a relatively complicated double-bellows arrangement.

SUMMARY OF THE INVENTION

It is an object of the present invention to provide an articulated cover means which is simple, economical to manufacture and to assemble, and readily adapted to the environment of a table saw intended for contractor and consumer usage.

In accordance with the broad teachings of the present invention, a pair of articulated cover members are disposed in the housing substantially flush against the opening therein. One of the cover members is free to pivot in response to the limited pivotal movement of the bevel control means to which the elevation control lever is coupled. This one cover member substantially covers the opening in the front panel throughout the pivoted movement of the elevation control lever. This one cover member has an elongated opening therein through which the elevation control lever projects, and the other cover member is carried by the elevation control lever and substantially covers the elongated opening in the first cover member. Thus complete coverage is assured for the limited translational movement of the elevation control lever in any position of the bevel control means.

In accordance with the further teachings of the present invention, the cover members are substantially flat and are made of a suitable plastic material. Respective coil springs, which are relatively light, hold the cover members flush against each other and against the opening in the front panel of the housing. The first cover member has a plan outline which is approximately in the form of a sector of a circle, while the second cover member comprises a circular disc.

These and other objects of the present invention will become apparent from a reading of the following specification, taken in conjunction with the enclosed drawings.

BRIEF DESCRIPTION OF THE DRAWINGS

FIGS. 5-8 are schematic sequence views showing the manner in which the opening in the front panel of the table saw is covered for the total excursion of traverse of the elevation control lever;

FIG. 9 is an alternate embodiment of the first cover member for a particular housing configuration; and FIG. 10 is a view, taken along the lines 10—10 of FIG. 9.

DETAILED DESCRIPTION

Figure 1:
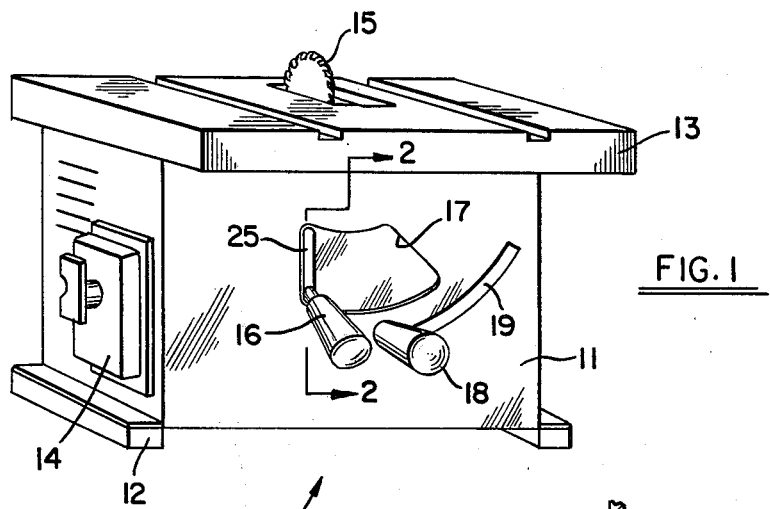
FIG. 1 is a front isometric view of a table saw having a preferred embodiment of the dust cover means of the present invention.

With reference to FIG. 1, there is illustrated a table saw 10 with which the teachings of the present invention may find more particular utility. However, it will be appreciated by those skilled in the art that the teachings of the present invention are equally applicable to a wide variety of power-driven tools, machinery and other devices.

With this in mind, the saw 10 (which is intended for use by contractors and advanced home craftsmen) has a housing 11 supported on feet 12, a table top 13, switch box 14, and saw blade 15, the blade being driven by a motor (not shown) within the housing. The saw has an elevation control lever 16 extending through an opening 17 in the housing. A bevel control lever 18 extends through a quadrant-shaped slot 19 in the housing.

In this preferred embodiment, as shown in FIG. 1, the saw blade is in its raised zero degree position, and the elevation control lever 16 is in its lowermost position within the opening 17 and is suitably locked in place. In this position, a workpiece (not shown) may be supported on the table and moved into engagement with the blade. Additionally, the elevation control lever 16 may be unlocked and raised to a desired vertical position within the opening 17, and then locked in that position, so that the saw blade will be lowered accordingly, relative to the table to a desired depth-of-cut position.

In the alternate mode of operation, and as illustrated and described in the aforesaid prior art patents, the elevation control lever 16 may be unlocked, raised to its uppermost position in the opening 17, and then lowered to raise the blade up out of the housing by a proportionate amount so as to make a cut in a workpiece held securely on the table. Moreover, and again as illustrated and described in the aforesaid prior art patents, and as will be readily appreciated by those skilled in the art, the elevation control lever 16 is coupled within the housing to a bevel control means including the bevel control lever 18. Thus the elevation control lever 16 has a conjoint movement with the bevel control lever 18, the latter moving through an arc of forty-five degrees corresponding to a desired bevel cut of the saw blade. At any given setting of the bevel control means from zero to forty-five degrees, the elevation control lever 16 has a limited translational movement to facilitate a cut in either of the two modes of operation of the saw. As a result, the elevation control lever 16 has a relatively large traverse, and the opening 17 is of sufficient size and shape to accommodate this traverse.

Figure 2:
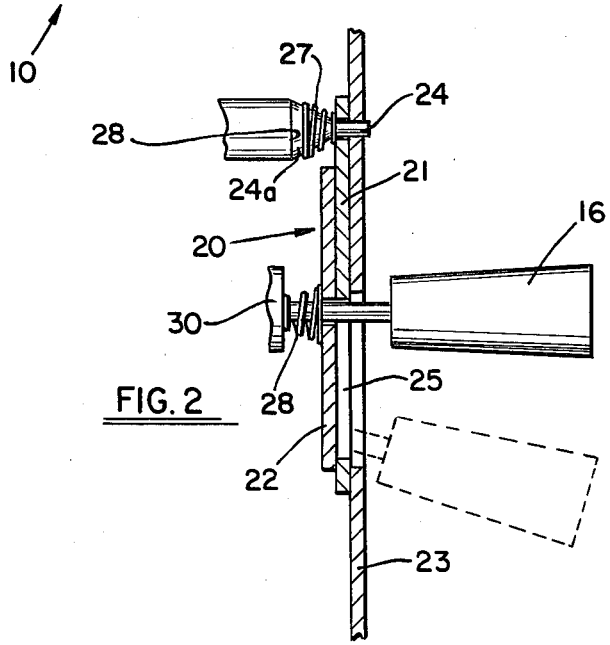
FIG. 2 is a section view, taken along the lines 2—2 of FIG. 1, but drawn to an enlarged scale and with the elevation control lever in a raised position, and showing the pair of cooperating cover members.
Figure 3:
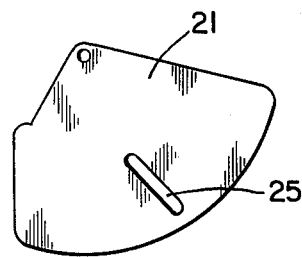
FIG. 3 is a plan view of the first cover member.
Figure 4:
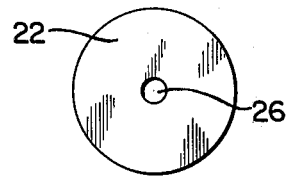
FIG. 4 is a plan view of the second cover member.

With reference to FIGS. 2–4, there is illustrated a preferred embodiment of the articulated dust cover means 20 of the present invention. This means comprises a pair of cover members, including a first cover member 21 and a second cover member 22. The first cover member 21 has a plan outline, as shown in FIG. 3, which is approximately that of a sector of a circle. The second cover member 22, as shown in FIG. 4, preferably has a plan outline in the form of a circular disc. Both of the cover members are formed of substantially-flat sheet plastic (or other suitable insulating material).

With reference again to FIG. 2, the first cover member 21 is disposed substantially flush against the inside of the front panel 23 of the housing for the table saw. The first cover member is pivotably supported on a pivot rod 24 and has an elongated or slotted opening 25 formed therein. The elevation control lever 1 extends through the elongated opening; and as previously noted, the elevation control lever has a limited translational movement, which is accommodated by the length of the elongated opening 25. Pivotal movement of the bevel control means causes the elevation control lever to pivot, and the lever engages the side of the elongated opening to pivot the first cover member; thus the first cover member has a conjoint pivotal movement with the bevel control means. The second cover member has a round hole 26 to receive the elevation control lever, and the second cover member is thereby carried by the elevation control lever during its limited translational movement. The second cover member is disposed substantially flush against the first cover member, as shown in FIG. 2, on the side of the first cover member opposite to the front panel of the saw housing. A coil spring 27 is seated on the pivot rod 24 between the first cover member 21 and a shoulder 28 formed on the end of the tapered portion 24a of the pivot rod. A conical spring 29 holds the second cover member against the first cover member. This spring 29 is seated on the rod 16a of the elevation control lever 16, between the second cover member and a fixed part 30 of the elevation mechanism. These springs hold the cover members substantially flush against each other and against the inside of the front panel, but the springs are relatively light so as not to cause any undue friction or drag in the movement of the first cover member with respect to the first panel or movement of the members with respect to each other.

With reference to the sequence views of FIGS. 4–8, the first cover member 21 substantially covers the opening 17 in all positions of the bevel control means from zero to forty-five degrees, and the second cover member substantially covers the elongated opening 25 in the first cover member 21 in the limited translational movement of the elevation control lever 16 within the elongated opening. Thus, FIG. 5 shows the zero degree position, with the elevation control lever 16 "up" and with the blade retracted within the housing; and as shown, the first cover member 21 covers the opening 17 in the front panel. FIG. 6 corresponds to FIG. 5, but shows the elevation control lever 16 all the way "down" to raise the saw blade to its maximum extent above the table; and as shown, the second cover member 22 is sufficiently large to cover the elongated opening 25 in the first cover member 21, as the lever 16 is moved (vertically) through its limited extent. As shown in FIG. 7, the bevel control means is in its maximum forty-five degree position, with the elevation control lever 16 in its "up" position within the elongated opening 25 and with the blade retracted. FIG. 8 corresponds to FIG. 7, but shows the elevation control lever 16 all the way "down" in the elongated opening 25 and the blade raised above the table. Thus, throughout the movements of the bevel control means (and the elevation control lever 16 carried thereby) from zero to forty-five degrees, the opening 17 in the front panel is covered by the first cover member 21; and at any position of the bevel control means, the elongated opening 25 in the first cover member 21 will be covered by the second cover member 22 for the full extent of the limited translational movement of the elevation control lever 16. The opening 17 in the front panel is thus completely covered against dust and debris entering into the housing, and against any inadvertent contact of the user's body or clothing, during operation of the table saw. The complete coverage is assured throughout the relatively large traverse of the elevation control lever 16, and the coverage is obtained in a direct, simple and economical manner.

With reference to FIGS. 9 and 10, an alternate embodiment of the first cover member is shown, as at 21a. In this embodiment, a ridge 31 has been formed in the otherwise flat member. The purpose of the ridge is to clear an obstruction (not shown) within the saw housing, yet still maintain the member substantially flush against the opening 17 in the front panel of the saw housing.

Obviously, many modifications may be made without departing from the basic spirit of the present invention. For example, the second cover member 22 may be made smaller (if desired) so that the elongated opening is substantially covered (but not completely covered) during the translational movement of the elevation control lever. Accordingly, it will be appreciated by those skilled in the art that within the scope of the appended claims, the invention may be practiced other than has been specifically described herein.

I claim:

1. In combination with a power-operated saw having a housing provided with a table, a motor-driven saw blade projecting above the table, means including an elevation control lever for raising and lowering the blade with respect to the table to adjust the depth of cut, bevel control means for tilting the saw blade with respect to the table, the elevation control lever being movable in all positions of the bevel control means, whereby the elevation control lever has a relatively large traverse, the housing having a front panel with an opening formed therein through which the elevation control lever projects, the opening being of sufficient size and shape to accommodate the relatively large traverse of the elevation control lever, an articulated cover means for the opening in the front panel of the housing, said cover means comprising a first cover member having a conjoint movement with the bevel control means, the first cover member being disposed substantially flush against the inside of the front panel and substantially covering the opening in the front panel in all positions of the bevel control means, the first cover member having an elongated opening therein through which the elevation control lever extends, and a second cover member carried by the elevation control lever and disposed substantially flush against the first cover member, the second cover member substantially covering the elongated opening in the first cover member as the elevation control lever is moved within the elongated opening in the first cover member.

2. The combination of claim 1, wherein said first cover member comprises a substantially flat member having a plan outline which is approximately in the form of a sector of a circle.

3. The combination of claim 1, wherein said second cover member comprises a substantially flat member in the form of a circular disc.

4. The combination of claim 1, wherein said first and second cover members are formed from a plastic material.

5. The combination of claim 1, wherein the bevel control means includes a pivot rod in the housing, and wherein the first cover member is pivotably mounted on the rod.

6. The combination of claim 1, wherein the second cover member is disposed on the side of the first cover member which is opposite to the front panel of the housing.

7. The combination of claim 6, further including a spring to hold the first cover member up against the front panel.

8. The combination of claim 7, further including a spring to hold the second cover member against the first cover member.

9. In a power-operated saw having a housing provided with a table, a motor-driven saw blade projecting above the table, means including an elevation control lever for raising and lowering the blade with respect to the table to adjust the depth of cut, means for making a cut by raising the elevation control lever and thereby bringing the blade up out of the housing and into engagement with a workpiece held on the table, bevel control means for tilting the saw blade with respect to the table, the elevation control lever being movable in all positions of the bevel control means, whereby the elevation control lever has a relatively wide traverse, the bevel control means further including a pivot rod in the housing, the housing having a front panel with an opening formed therein through which the elevation control lever projects, the opening being of sufficient size and shape to accommodate the relatively large traverse of the elevation control lever, and an articulated cover means for the opening in the front panel of the housing, said cover means comprising a first cover member pivotably mounted on the pivot rod in the housing and having a conjoint movement with the bevel control means, the first cover member comprising a substantially-flat piece made from an insulating material and having a plan outline approximately in the form of a sector of a circle, the first cover member being disposed substantially flush against the inside of the front panel of the housing and having a sufficient size and shape to substantially cover the opening in the front panel in all positions of the bevel control means, the first cover member having an elongated opening formed therein, the elevation control lever extending through the elongated opening, a second cover member carried by the elevation control lever and disposed substantially flush against the first cover member on the side of the first cover member which is opposite to the front panel, the second cover member comprising a substantially-flat piece formed from an insulating material, and the second cover member substantially covering the elongated opening in the first cover member as the elevation control lever is moved within the elongated opening in the first cover member.

10. In a machine having a housing with an opening therein through which a control lever projects, the control lever having a relatively wide traverse within the opening, the traverse comprising a limited pivotal movement of the control lever about an axis and further comprising, at any given pivoted position, a limited translational movement in a plane which is transverse to the plane of its pivotal movement, means for covering the opening substantially throughout the total excursion of traverse of the control lever, said means comprising a pair of articulated members in the housing, the members being disposed substantially flush against each other and against the opening in the housing, means for pivoting one of the members in response to the limited pivotal movement of the control lever about its pivot axis, said means including an elongated opening in the one member and the control lever projecting therethrough, the one member being of sufficient size and shape to substantially cover the opening in the housing during its pivotal movement, and the other member being carried by the control lever in its limited translational movement to substantially cover the elongated opening in the one member.

11. In a machine including a housing having a panel with an opening formed therein, and a control lever projecting through the opening, an articulated dust cover means for the opening, said means comprising a pair of substantially flat members, one of the members having a plan outline approximately in the form of a sector of a circle, said one member being pivotably mounted in the housing and being disposed substantially flush against the inside of the front panel, said one member having a slotted opening formed therein through which the control lever projects, whereby said one member pivots in accordance with pivotal movement of the control lever within the opening, said one member being of sufficient size and shape to cover the opening in the front panel in substantially all pivoted positions of the control lever, and the other member being carried by the control lever and being substantially flush against the first member, whereby the slotted opening in the first member is covered in substantially all positions of the control lever relative to the slotted opening.

* * * * *